United States Patent Office 2,778,758
Patented Jan. 22, 1957

2,778,758
GLASS LAMINATE, ARTICLE AND METHOD

James E. Henning, Madison, Wis., assignor to Bjorksten Research Laboratories, Inc., a corporation of Illinois No Drawing. Application July 28, 1952,
Serial No. 301,393

4 Claims. (Cl. 154—2.75)

This invention relates to means for adhering fluoro polymers to glass and more particularly for adhering poly tetrahalo ethylene to glass, or to any other substance having oxygen or hydroxy groups chemically present at the surface.

In accordance with this invention, I prepare the reaction product of a halogenated alkanol containing more than one halogen atom per molecule, such as for example, trichloro tertiary butyl alcohol, dichloro sec. butyl alcohol, diiodo fluoro tertiary amyl alcohol, tribromo butyl alcohol, and the like, with a compound such as titanium tetrachloride, by mixing these ingredients in a ratio between from 1 to 90 parts of one of the ingredients with 90 to 1 parts of the other. These reaction products may be prepared in any common organic solvent which is inert to the metal halide. The reaction product thus prepared is applied to a glass surface or a surface of a metal which is capable of forming an oxide layer adjacent its immediate surface, such as for example, aluminum, magnesium, chromium, steel, tin, and the like, and the surface is then washed with water to remove hydrolyzable halogen which tends to improve the adhesion.

The invention is further illustrated by the following specific examples:

*Example 1*

35.5 grams of trichloro tertiary butanol were dissolved in 35 grams of xylol, and were then added to 38 grams of titanium tetrachloride, also dissolved in 38 grams of xylol. Addition was made slowly with stirring. After a period of 40 minutes the mixture was diluted to 200 cc. with xylol and after stirring was applied to the surface of the glass to which it was desired to bond the fluorinated resin.

The glass was then soaked 30 minutes in water and was dried by rubbing with a dry cloth. Sheets of dried glass treated as above were then placed on each side of a sheet of poly trifluoro chloroethylene and were pressed together for about 20 minutes at 240° C. at a pressure of 100 p. s. i. The resultant sandwich was strong and was perforated by a clean, round hole, without shattering or delamination, on shooting at temperatures from 0 to +300° F.

*Example 2*

35.5 grams of trichloro tertiary butanol were dissolved in 35 grams of xylol, and were then added to 38 grams of titanium tetrachloride dissolved in 38 grams of xylol. Addition was made slowly with stirring. After a period of 40 minutes the mixture was diluted to 600 cc. with xylol. After stirring, it was applied to the surface of the glass to which it was desired to bond the fluorinated resin.

The glass was then soaked in water, dried and laminated as in Example 1.

*Example 3*

Trichloro tertiary butanol and titanium tetrachloride are diluted and reacted as in Example 2. After 20 minutes the reaction mixture is applied without further dilution to glass, soaked in water, dried, and laminated as in Example 1.

*Example 4*

8.9 grams of trichloro tertiary butanol dissolved in 10 grams of xylol were added to 38 grams of titanium tetrachloride in 38 grams of xylol. After 40 minutes the mixture is diluted to 100 ml. and applied to a glass surface. Soaking, drying, and laminating follow as in Example 1.

*Example 5*

Trichloro tertiary butanol and titanium tetrachloride are reacted as in Example 1. After 5 minutes the reaction mixture is diluted to 1 liter. Glass plates are treated with this solution, soaked in water, dried, and laminated as in Example 1.

*Example 6*

35.5 grams of trichloro tertiary butanol dissolved in 50 grams of xylol are added slowly with stirring to 17.0 grams silicon tetrachloride dissolved in 17 grams of xylol. After 40 minutes, the reaction mixture is diluted to 200 ml. and applied to glass surfaces. The glass is then dipped in or sprayed with water, dried, and laminated as in Example 1.

*Example 7*

31.1 grams of tribromo tertiary butanol dissolved in xylol were added to 19.0 grams of titanium tetrachloride also 50 percent in xylol. After 40 minutes the mixture was diluted to 200 ml. and applied to glass plates. The glass was then soaked in water and laminated as in Example 1.

*Example 8*

Glass is treated as in Example 1 and laminated with an interlayer sheet of high molecular weight poly-dichloro difluoroethylene.

*Example 9*

Glass is treated as in Example 6 and laminated with an interlayer sheet of poly dichloro difluoro ethylene.

*Example 10*

20 grams of trifluoro ethanol in 20 grams of xylol are reacted with 38 grams silicon tetrachloride in 40 grams of xylol. After the reaction has ceased, the mixture is diluted with 200 cc. of xylol. The reaction mixture is then applied to glass by dipping or spraying and the glass washed in water and dried. Laminating was carried out as in Example 1.

*Example 11*

21.4 grams of heptafluoro butanol in 2.0 grams of xylol were reacted with 19 grams of silicon tetrachloride in 20 grams of xylol. After a period of forty minutes the reaction mixture was diluted with 50 cc. of xylol and applied to glass plates. The plates were soaked in water, dried, and laminated as in Example 1.

*Example 12*

18.3 grams of 1,1,2 trichloro 2,fluoro, propanol-3 in 20 grams of xylol were reacted with 17 grams silicon tetrachloride. After 60 minutes the reaction mixture was diluted with 100 cc. of xylol. Glass plates were treated with this solution, washed in water, dried, and laminated as in Example 1.

Example 13

25.2 grams of 1 chloro, 1,2 dibromo propanol-3 in 25 grams of xylol were reacted with 17 grams of silicon tetrachloride in 20 grams of xylol. After 30 minutes the reaction was diluted with 100 ml. of xylol and applied to glass plates. The plates were soaked in water, dried, and laminated as in Example 1.

Example 14

8 grams of 1,2,2 trichloro propanol-3 in 15 grams of xylol is added to 19 grams titanium tetrachloride in 20 grams of xylol. After 40 minutes the mixture was diluted with 150 ml. of xylol and applied to glass plates. The plates were soaked in water, dried, and laminated as in Example 1.

Example 15

35.5 grams of trichloro tertiary butanol in 30 grams of xylol were added to 34 grams silicon tetrachloride in 34 grams of xylol. After 30 minutes the reaction mixture was diluted to 400 ml. with xylol, and applied to glass plates. The plates were soaked in water, dried, and laminated as in Example 1.

Example 16

26.7 grams of pentachloro phenol in 5 grams of xylol were added to 19 grams titanium tetrachloride in 5 grams of xylol. After 120 minutes the mixture was diluted to 100 ml. with xylol and applied to glass plates. The plates were soaked in water, dried, and laminated as in Example 1.

Example 17

21.2 grams of tetrachloro secondary butanol dissolved in 22 grams of xylol are added to 17.0 grams of silicontrichloride in 17 grams of xylol. After 35 minutes the mixture is diluted to 300 ml. and applied to one surface of each of several glass plates. The glass plates are then soaked in water for thirty minutes, thoroughly dried and a sheet of polymerized chlorodifluoro-ethylene is laminated between the treated surfaces of two such glass plates as in Example 1.

Example 18

35.5 grams of trichloro tertiary butanol dissolved in 35 grams of xylol are added to 15.7 grams of dichlorodifluoro-titanium in 16 grams of xylol. After the mixture is stirred for 40 minutes it is diluted to 200 ml. and applied to the surfaces of several glass plates. Soaking, drying and laminating follow as in Example 1.

Example 19

12.8 grams of trifluoro tertiary butanol dissolved in 13 grams of xylol are added slowly, with stirring, to 12.1 grams of trifluorochloro silicon dissolved in 12 grams of xylol. The mixture is stirred for 60 minutes, diluted to 500 ml. with xylol and applied to several glass surfaces. The glass plates are soaked in water, dried, and formed into a laminate under heat and pressure with an interlayer comprising polymerized fluorotrichloro ethylene.

While the examples show the applicability in many ways of my invention they should not be considered limiting since equivalents are also useful.

For example, the examples have shown a limited number of polymers, but the invention works well with polytetrafluoroethylene and usable results are obtained with other fluoropolymers such as polymerized trifluoroethylene, polymerized trichloroethylene, polymerized difluorochloroethylene, polymerized difluoroethylene, polymerized dichloroethylene, and other polymerized mono, di or tri halogenated ethylenes, in which the halogen is chlorine or fluorine or both and useful results may be obtained with other fluoro-polymers such as polyfluoroacrylates and methacrylates, polyfluorostyrenes such as polymerized 2,5-difluorostyrene, and their copolymers and generally to fluoro analogues of known resinous polymers.

It will be noted that the preferable polymers are polymerized tri- and tetra-haloethylenes where the halogen is fluorine, chlorine or both, this group being more aptly described as a substance selected from the group consisting of polymerized di- and tri-haloethylenes where the halogen is fluorine, chlorine or both.

Titanium tetrachloride and silicon tetrachloride are shown in the examples as suitable materials for reacting with halogenated alkanol to form the described composition for treating glass surfaces. These metals constitute those in the fourth group of the periodic table which have an atomic weight between 27 and 49. Suitable results are also obtained with germanium tetrachloride, and the trichlorides may be used in place of the tetrachlorides.

Thus the preferable compounds are best described as tri- and tetra-halides of those group 4 metals having an atomic weight between 27 and 49 and wherein the halogen of said halide is fluorine or chlorine, or both.

The concentration of solutions of fourth group metal halides and halogenated alkanols may be varied from 5 to 95% of solutes in the solvent or solvents, although I obtained the best results within the range of 30 to 90%

The time of reaction to produce the above-mentioned reaction product is not too critical, and favorable results have been obtained with times of from two minutes to three hours, although generally 20 to 40 minutes is the preferred range.

The lamination time is preferably from 15 to 25 minutes, although there is some adhesion in as short a time as 30 seconds, and the process can be lengthened indefinitely, except for considerations of time economy. The preferred laminating temperature is between 240 and 280° C., and the preferred pressure range between 20 and 500 p. s. i. although variations here too are permitted.

The examples have shown only one solvent, xylol, but other solids are suitable, such as for example, high flash naphtha, chloroform, toluene, benzene, mineral spirits and the like, the solvent not being critical for the invention since any one of the solvents are suitable which are solvents both for tri- and tetra-halides of silicon, titanium and germanium and also are solvents for multihalogenated alkanols having from 2 to 8 carbon atoms.

The examples have shown halogenated alkanols comprising from two to five carbon atoms. This is the preferred range of compounds for the purpose of the invention but suitable results are also obtained with alcohols containing a greater number of carbon atoms and especially with those containing six to eight carbon atoms so that although the preferred range is from two to fiive carbon atoms, the suitable range is from two to eight carbon atoms and the reaction products with alkanols containing one carbon atom or more than eight carbon atoms may be useful.

It is thus seen that the invention is broad in scope and is not to be restricted excepting by the claims, in which it is my intention to cover all novelty inherent in this invention as broadly as possible in view of prior art.

Having thus disclosed my invention, I claim:

1. A laminate comprising in combination: sheets of glass each having at least one surface coated with the reaction product of a multihaloalkanol and a substance selected from the group consisting of tri- and tetra-halides of titanium and silicon and laminated therebetween an interlayer material comprising polyhaloethylene.

2. In a laminate, comprising sheets of glass having an interlayer of polyhaloethylene thereinbetween, a sheet of glass having at least one surface coated with the reaction product of a multihaloalkanol and a substance selected from the group consisting of tri- and tetra-halides of titanium and silicon.

3. The method of making a glass and plastic laminate which comprises treating the surface of a glass body with the reaction product of a multihaloalkanol and a substance selected from the group consisting of tri- and tetra-halides of titanium and silicon washing said treated surface with water to remove by hydrolysis halogen atoms remaining on the surface, removing the water and laminating polyhaloethylene to said treated surface by means of heat and pressure.

4. A process for adhesively joining the surfaces of a glass body and a body of polychlorotrifluoroethylene comprising applying to a surface of said glass body a coating comprising the reaction product of a multihaloalkanol and a substance selected from the group consisting of tri- and tetra-halides of titanium and silicon, washing said treated surface with water to remove by hydrolysis halogen atoms remaining on the surface, removing the water and laminating said surfaces together by means of heat and pressure.

References Cited in the file of this patent

UNITED STATES PATENTS

| 2,484,484 | Berry | July 6, 1948 |
| 2,456,262 | Fields | Dec. 14, 1948 |
| 2,495,286 | Brubaker | Jan. 24, 1950 |
| 2,502,286 | Sowa | Mar. 28, 1950 |
| 2,539,329 | Sanders | Jan. 23, 1951 |
| 2,566,365 | Pedlow et al. | Sept. 4, 1951 |

FOREIGN PATENTS

| 612,125 | Great Britain | Nov. 9, 1948 |